(12) United States Patent
Choe et al.

(10) Patent No.: US 10,083,345 B2
(45) Date of Patent: Sep. 25, 2018

(54) MAKEUP SUPPORTING METHODS FOR CREATING AND APPLYING A MAKEUP GUIDE CONTENT TO MAKEUP USER'S FACE ON A REAL-TIME BASIS

(71) Applicants: Myongsu Choe, Montreal (CA); Seyoung Choe, Montreal (CA)

(72) Inventors: Myongsu Choe, Montreal (CA); Seyoung Choe, Montreal (CA)

( * ) Notice: Subject to any disclaimer, the term of this patent is extended or adjusted under 35 U.S.C. 154(b) by 266 days.

(21) Appl. No.: 15/147,176

(22) Filed: May 5, 2016

(65) Prior Publication Data

US 2016/0328632 A1    Nov. 10, 2016

Related U.S. Application Data

(60) Provisional application No. 62/157,151, filed on May 5, 2015.

(51) Int. Cl.
| | | |
|---|---|---|
| G06K 9/00 | (2006.01) | |
| G06K 9/62 | (2006.01) | |
| G06T 11/00 | (2006.01) | |
| H04N 5/232 | (2006.01) | |

(52) U.S. Cl.
CPC ....... *G06K 9/00268* (2013.01); *G06K 9/6253* (2013.01); *G06T 11/00* (2013.01); *H04N 5/23219* (2013.01); *H04N 5/23293* (2013.01)

(58) Field of Classification Search
CPC ............ G06K 9/00268; G06K 9/6253; H04N 5/23219; G06T 11/00

USPC .......................................................... 348/77
See application file for complete search history.

(56) References Cited

U.S. PATENT DOCUMENTS

| | | | |
|---|---|---|---|
| 5,787,419 A | 7/1998 | Sato et al. | 707/4 |
| 6,937,755 B2 | 8/2005 | Orpaz et al. | 382/162 |
| 8,077,931 B1 | 12/2011 | Chatman et al. | 382/118 |
| 8,306,286 B1 | 11/2012 | Chatman et al. | 382/118 |
| 8,693,768 B1 | 4/2014 | LaForgia | 382/162 |
| 2012/0223956 A1* | 9/2012 | Saito | A45D 44/005 345/582 |

FOREIGN PATENT DOCUMENTS

| | | | | |
|---|---|---|---|---|
| KR | 10-2011-0127396 | 11/2011 | | H04B 1/40 |
| KR | 10-2012-0066773 | 6/2012 | | G06T 7/40 |

* cited by examiner

*Primary Examiner* — Nam D Pham
(74) *Attorney, Agent, or Firm* — Harness, Dickey & Pierce, P.L.C.

(57) ABSTRACT

This disclosure provides a real time makeup supporting method which generates a makeup guide content in real time corresponding to a user's facial image. In accordance with an embodiment of the present invention, a makeup supporting application is installed at a device. And the makeup supporting application enables to access a personal image classification table that maps between personal image classifications and personal image rules. A user executes the makeup supporting application, and user's personal image data are collected in real time by a built-in camera module equipped at a device.

11 Claims, 8 Drawing Sheets

MAKEUP SUPPORTING METHODS FOR CREATING AND APPLYING A MAKEUP GUIDE CONTENT TO MAKEUP USER'S FACE ON A REAL-TIME BASIS

CROSS-REFERENCE TO RELATED APPLICATION

This application claims the benefit of Ser. 62/157,151, filed on May 5, 2015 in the U.S. Patent and Trademark Office, the disclosure of which is incorporated herein by reference.

FIELD

The present disclosure relates to a makeup technology using computer applications.

BACKGROUND

People wear makeup. Although people do their makeup for skin-related health issues to prevent harmful ultra violet rays, generally, the main purpose of makeup is to show their beauty to others. Due to these reasons, the beauty criteria are difficult to be determined in the same way. But there are no people to do their makeup in order to be shown as persons with bad impressions for themselves. In other words, people want to show their favorable impressions by revising or complementing their faces by makeup.

A makeup consists of materials and styles. The materials mean cosmetic products that are to be used for the makeup. There are varieties of functional cosmetic products as well as makeup products to be considered for different skin types of makeup users. The makeup style means the changes to a face in the result. How to do makeup effectively is a very difficult question. Although knowledge and experiences about makeup techniques are necessary, above all, there exist fundamental limitations because people have different facial features and skin types.

There are beauty specialists who can provide makeup knowledge and experiences to clients. They are able to provide makeup services at beauty salons and cosmetics stores. Also, by consulting fashion and makeup related magazines, and various web sites via a wireless mobile device as well as video platforms (e.g., YouTube and etc.), all the content about makeup techniques and styles are distributed and shared easily. People usually purchase skilled professional's makeup techniques or make use of the makeup methods from magazines or web sites by imitating them. These traditional techniques that are heavily dependent on other people or sources still present limitations and problems. In the case of doing makeup alone, these sources do not provide any help. In particular, when facial features and skin types per person are emphasized as differences, 'one person's makeup experiences and 'the other person's makeup knowledge may be useless or can sometimes be unfavorable to 'me'.

To do makeup alone, a person needs to see one's own face. It means that by using a camera embedded at a wireless mobile device such as a smartphone, one can look at one's own face directly. All of the present mobile makeup applications in the market try to obtain a makeup target image via a camera, and to get the makeup products' information, and then usually to perform a virtual makeup by only applying the corresponding products to the makeup target image.

But these applications only focus on knowing the kinds of feelings that a beauty product that is to be purchased can give to a makeup user in advance, not about providing makeup techniques to make a makeup user's face more beautiful and favorable.

SUMMARY

The inventors of this disclosure have been doing research about a self-makeup methodology by using a mobile application that can be installed at a user's mobile device. Therefore, this invention finally has been completed after doing research for years to seek technical solutions about how to do makeup very efficiently.

People have different facial appearances. And depending on the situations, places, time, and feelings, desirable personal images for each person may be different. Makeup can affect and create many influences on a personal image. The methods and devices disclosed herein provide optimal makeup supports by carefully considering the characteristics of a user's personal image.

Features for each person's personal image can be categorized and patterned. Therefore, another embodiment of this disclosure is closely required to examine mutual relationships between a makeup and a personal image by categorizing and patterning personal image's features, and creating the rules to a personal image.

Moreover, another embodiment of this disclosure is to respond to the diverse needs of users. To sum up, a makeup supporting method of this disclosure considers the personal image's features that are wanted depending on the user's situations, places, time, and moods as well as the unique personal image's features with the user's face and skin types. A personal image finally created by makeup is changing every day. This invention emphasizes on such realities and desires.

An optimal makeup that users want is frequently changing. In that case, a makeup supporting service that provides to the users also has to be changed. In this regard, a makeup supporting technology of this disclosure has dynamic features.

On the other hand, other purposes that are not specified in this disclosure will be additionally considered within the scope that is easily inferred from the following detailed explanations and the effects.

To accomplish this task, the first stage of the present invention as a makeup supporting method comprises that:

a makeup supporting application installed at a device is accessing a personal image classification table that maps between personal image classifications and personal image rules:

the makeup supporting application is executed, user's personal image data by a built-in camera module at a device is collected in real time, a makeup guide content is generated by applying previously determined or previously stored personal image rules depending on personal image classification chosen by a selection event to the personal image data, the makeup guide content via a screen of the makeup supporting application is displayed.

In accordance with an embodiment of the present disclosure, as a makeup supporting method, the makeup supporting application provides a personal image selection interface corresponding to makeup purposes, and a device's input means creates a personal image classification selection event by the personal image classification selection interface, or personal image classification as a modifiable default value by an application's environmental setting is previously determined.

Furthermore, in accordance with an embodiment of the present disclosure, in a makeup supporting method, creating the makeup guide content is generated by matching and applying standard personal image data that is previously stored as the personal image rules to the user's personal image data.

Furthermore, in accordance with an embodiment of the present disclosure, in a makeup supporting method, a makeup guide content is a video file, and from a user's personal image data that is collected in real time, featured elements are extracted, by the personal image rules, at least one featured element is revised, and revised user's face image is displayed on the makeup supporting application screen.

Furthermore, in accordance with an embodiment of the present disclosure, a makeup guide content contains texts or voices, and featured elements from user's personal image data that is collected in real time are extracted, by the personal image rules, makeup guide texts or voices for at least one featured element are either displayed on the makeup supporting applications screen or output by a speaker.

Furthermore, in accordance with an embodiment of the present disclosure, in a makeup supporting method, the personal image rule has facial area classification data that is previously determined, and by applying this facial area classification data to the personal image data, a makeup guide content having pattern information for each facial area is generated.

The second stage of the present invention as a makeup supporting method from other views comprises that:

a makeup supporting application installed at a device is accessing a personal image classification table that maps between personal image classifications and personal image rules:

the makeup supporting application is executed, personal image data is collected from a user's facial image that is stored as an image file in a memory of a device, a makeup guide content is generated by applying previously determined or previously stored personal image rules depending on personal image classification chosen by a selection event to the personal image data, the makeup guide content is displayed by a screen of the makeup supporting application, the personal image rule has previously determined facial area classification data, by applying this facial area classification data to the personal image data, a makeup guide content with pattern information for each facial area is generated.

The third stage of the present invention as a device with a built-in camera module which has installed a makeup supporting application that applies personal image rules depending on personal image classifications comprises that:

at least one processor communicates with the camera module; and at least one memory is included to communicate with the processor, the memory contains instructions, when the instructions are executed by the processor, the processor performs:

an operation that collects user's personal image data in real time by the camera module of the device;

an operation that generates a makeup guide content by applying the previously determined by a device or the previously stored personal image rules depending on the personal image classification chosen by a selection event via a device to the personal image data; and an operation that displays the makeup guide content by the makeup supporting application screens.

In another embodiment, there is provided a makeup supporting method, the method comprising: collecting personal image data for a user from a built-in camera on a device, wherein the personal image data is collected in real time; generating a makeup guide content by applying personal image rules, wherein the personal image rules have been generated from a set of images of the user stored on the device, and wherein the personal image rules are stored on the device in a personal image classification table that maps between personal image classifications and personal image rules; and displaying the makeup guide content on a screen of the device.

In yet another embodiment, there is provided a device comprising: a built-in camera; a makeup supporting application that applies personal image rules depending on personal image classifications, at least one processor that is configured to communicate with the camera; and at least one memory that is configured to communicate with the processor, wherein the memory contains instructions that are configured to cause the processor to (1) collect the user's personal image data in real time by the camera, (2) generate a makeup guide content by applying personal image depending on the personal image classification chosen by a selection event to the personal image data, and (3) display the makeup guide content on a screen of the device.

People try to enhance their personal images by makeup. Desirous personal images are different for each person. Even though it involves the same person, the personal image can be different depending on the ambience (e.g., changes to the situations, moods, age, and etc.). While the inventors of this disclosure have been analyzing this psychology and reality, they established a system and designed algorithms by analyzing the dynamic meanings of personal images. As a result, this invention has advantages to provide an optimal real-time makeup support by mutual mappings between personal image classifications and personal image rules.

This invention innovates traditional methods that can only provide an image of a standard model that does not reflect the user's actual facial features. A makeup guide content of this disclosure can reflect the individual's facial features. Therefore, the most accurate makeup support is possible. Moreover, in accordance with an embodiment of the present disclosure, depending on the present situations and moods of the users and an execution of the moment of a makeup supporting application, the makeup guide content can be varying.

On the other hand, even if the effects are not explicitly mentioned here, in the description below that is expected from the technical features of this invention, its described effects and provisional ones are additionally commented, like handling with what the description of this invention are mentioned.

Attached diagrams are revealed to illustrate as references for understanding the technological concepts of this invention. Due to these diagrams, the claimed scope of this invention is not restricted.

DETAILED DESCRIPTION

Since embodiments of the present disclosure are merely examples for structural or functional description, the scope of the present invention will not be limited to the embodiments described herein. That is, since the embodiments may be variously modified and may have various forms, the scope of the present invention will be understood as including equivalents thereof which can embody technical concept thereof.

Figure 1:
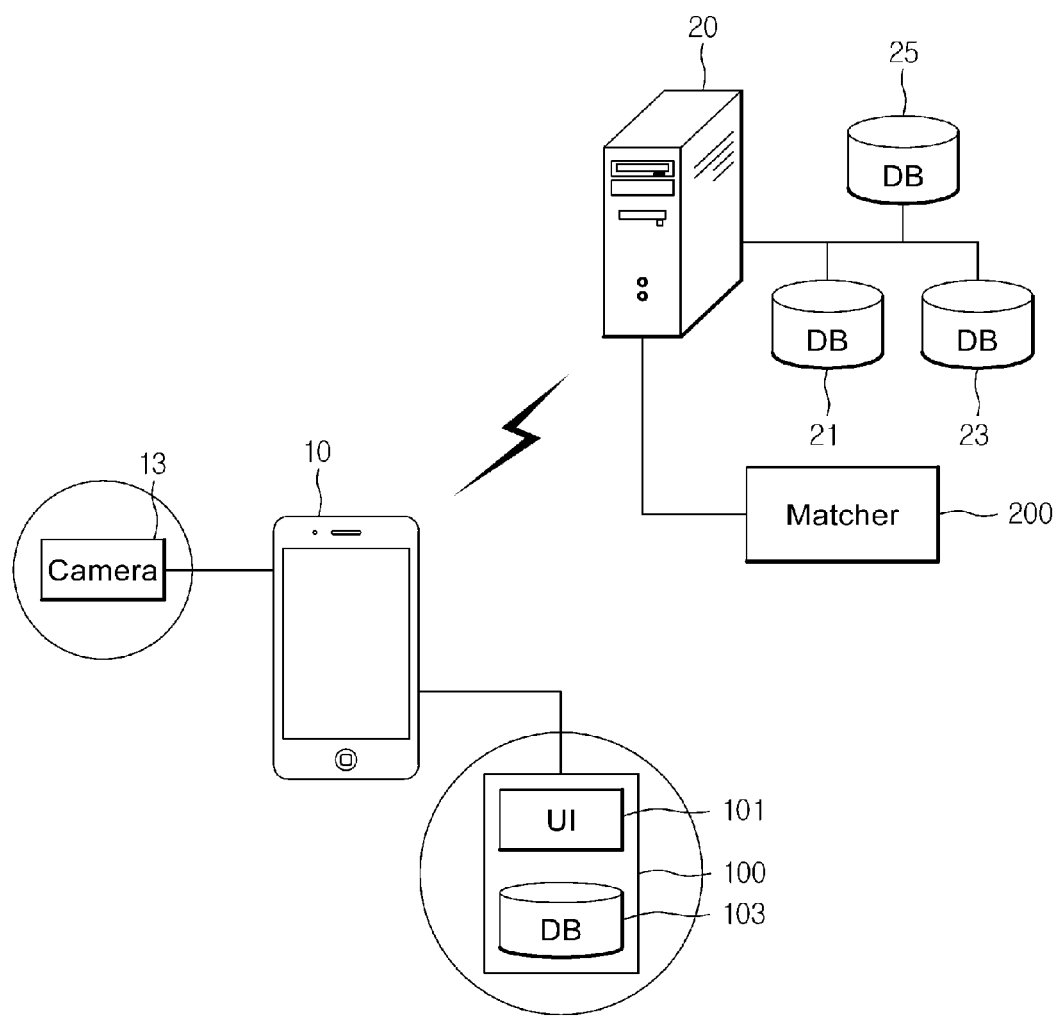
FIG. 1 is a schematic diagram of a system configuration example, in accordance with an example of an embodiment.

FIG. 1 depicts an example of a conceptual system configuration of this invention. A makeup supporting application 100 is installed at a user's device 10. And a makeup supporting method of this invention is implemented where the device 10 communicates with a service server 20 by executing the makeup supporting application 100.

A service server 20 contains hardware/software devices, by configuring services (e.g., service management, data processing and communications, database construction, security and authentication, face recognition solutions, and etc.) through multiple servers. The service server 20 constructs multiple databases and manages it. A database 25 records user's information and manages it. A database 23 can be a content database that stores content. Moreover, a database 21 can be a standard personal image database. A database dealing with miscellaneous logs, billing, product information, and etc. can also be configured additionally.

In a service server 20 of this invention, a matcher 200 can be contained. A matcher 200 has a personal image classification table and extracts standard personal image data from a standard personal image database 21 according to previously stored personal image classifications and personal image rules. And a makeup guide content is generated by matching user's personal image data that is sent from a user device 10.

A service server 20 sends a generated makeup guide content to a user's device 10 by a communication network.

A user device 10 can be installed by downloading the application software that a service server 20 provides, and when an installed application is executed, a processor has a computing functionality that calculates the previously determined functions and implements it.

A mobile device such as a smartphone, a tablet Personal Computer (PC), a laptop PC, and etc. is desirably good as a user device 10. Although an illustration of FIG. 1 is regarding a portable device such as a smartphone, this is restricted only for the conveniences of explanations. That is, it cannot be limited to only a portable device. As another embodiment of this invention, a device based on an Internet of Things (IoT) can be acceptable. A dressing table with a camera and a display panel may function as an optimal device. Furthermore, even if it does not exist up to now, a new device with configurations that are explained by the description of this invention may be included. For example, a makeup product vending machine equipped with a camera and a display panel can be a device of the instance.

A makeup supporting application 100 residing on a device's 10 memory that contains software modules and resources implemented by this invention has a user interface 101 which visualizes makeup supporting methods by the execution of the modules onto a screen. As an example of an embodiment of this invention, a standard personal image database 103 can be also constructed at a user device.

In case of the execution of a makeup supporting application 100 of this invention, by a user's selection or an application's setting, a camera module 13 of a device 10 can be enabled.

Figure 2:
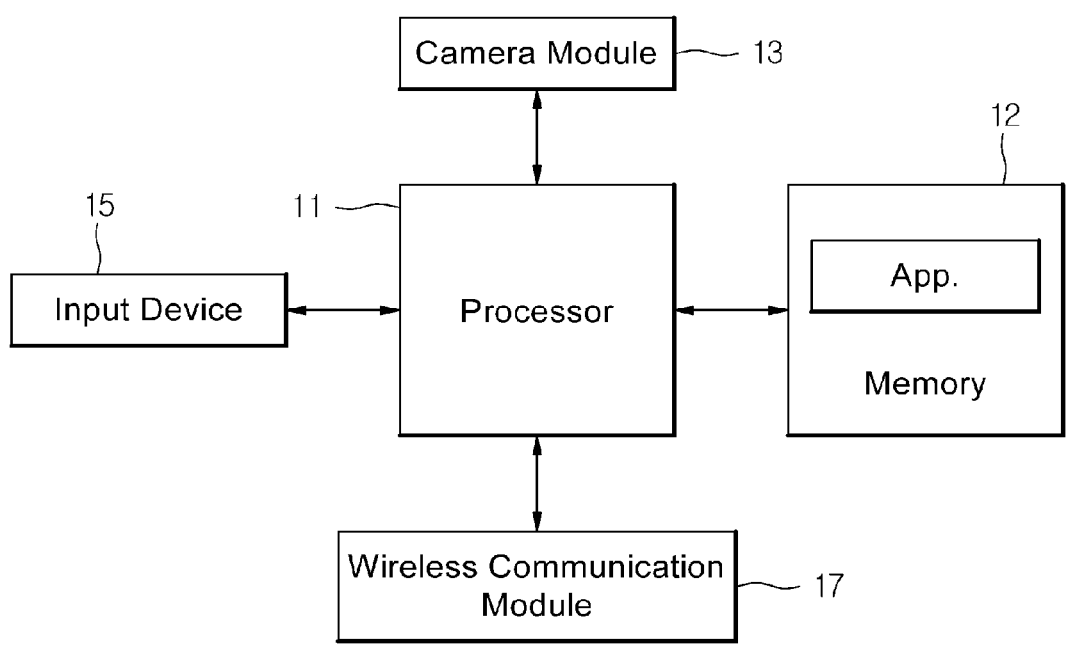
FIG. 2 illustrates an internal electronic configuration of a user device 10, in accordance with an example of an embodiment.

In FIG. 2, an example of an internal electronic configuration for a user device 10 of this disclosure is illustrated briefly. A device 10 consists of a processor 11, a memory 12, a camera module 13, and a wireless communication module 17.

An input unit 15 of a device 10 contains an input unit running on software or hardware, and as an output unit, a speaker and a display unit are also contained, which are not illustrated in FIG. 2. The display unit working as a touch screen consists of a screen for displaying as an output means and a screen for sensing user's touch events as an input means at the same time.

An internal memory 12 at a device 10 generally provides a space for storing computer code and data to be used at the device. As another embodiment of this invention, a firmware for any device can be stored in the internal memory 12 at the device 10 by containing resources that are necessary for execution and management of a makeup supporting application as well as a basic input and output system, operating systems, various programs, applications, or user interface functions to be run at the device, processor functions, and etc.

A processor 11 at a device 10 executes an operation that executes computer code with operating systems, generates data, and then uses it. Moreover, the processor 11 can receive and process input and output data between the device's 10 components by using a series of instructions. Also, the processor 11 is in charge of playing a role of a control unit to execute the functions of the operating systems' software and various application software (including a makeup supporting application) installed at the device 10. In particular, the processor 11 enables to control a camera module's 13 operation by connecting a makeup supporting application to the software that can control a camera module 13. Furthermore, by connecting a photo gallery stored in a memory 12, it can guarantee a function to fetch photo files. Personal image data generated by the camera module 13 can be stored as a form of a photo into a photo gallery in the memory 12.

Moreover, a processor 11 guarantees to be timely executed for a wireless communication module 17. By doing this via the wireless communication module 17, in regards to the application's execution and management, data communications between the service server 20 and the device 10 can be performed.

We now explain the major functions of this invention. A makeup supporting method of this invention can be desirably optimized so that a personal image classification table is previously established at a server and personal image classifications are given through the application screens.

In this invention, a personal image classification is meant to be previously defined at least one classification for responding makeup purposes. Like the classifications in Table 1, a personal image classification can be defined in advance. And a personal image rule responding to the corresponding personal image classification can be defined. The personal image rule contains makeup pattern information for each facial area. For example, featured elements of an area like an eye, an eyebrow, a lip, a cheek, and etc. can be registered as pattern information. The featured element registered as pattern information has an area classification, and data such as a vector, a color, a depth of color, types of beauty products for shapes formed on the face are assigned.

Table 1 shows a conceptual example of a personal image classification table as another desirable example of an embodiment of this invention.

TABLE 1

| Personal image classification | Personal image rule | | |
| --- | --- | --- | --- |
| | Area classification | Pattern information | Standard personal image data |
| Young impression | Area 1 | Pattern 1 | Standard personal image data 1 |
| | Area 1 | Pattern 2 | |
| | Area 3 | Pattern 3 | |
| | ... | ... | |
| Sexy impression | Area 1 | Pattern 11 | Standard personal image data 2 |
| | Area 2 | Pattern 22 | |
| | Area 3 | Pattern 33 | |
| | ... | ... | |
| Intellectual impression | Area 1 | Pattern 111 | Standard personal image data 3 |
| | Area 2 | Pattern 222 | |
| | Area 3 | Pattern 333 | |
| | ... | ... | |
| Cool impression | Area 1 | Pattern 1111 | Standard personal image data 4 |
| | Area 2 | Pattern 2222 | |
| | Area 3 | Pattern 3333 | |
| | ... | ... | |
| Warm impression | Area 1 | Pattern 11111 | Standard personal image data 5 |
| | Area 2 | Pattern 22222 | |
| | Area 3 | Pattern 33333 | |
| | ... | ... | |
| Natural impression | Area 1 | Pattern 1A | Standard personal image data 6 |
| | Area 2 | Pattern 2B | |
| | Area 3 | Pattern 3C | |
| | ... | ... | |
| Charming impression | Area 1 | Pattern 11A | Standard personal image data 7 |
| | Area 2 | Pattern 22B | |
| | Area 3 | Pattern 33C | |
| | ... | ... | |
| Physiognomic impression | Area 1 | Pattern 1AA | Standard personal image data 8 |
| | Area 2 | Pattern 2AB | |
| | Area 3 | Pattern 3AC | |
| | ... | ... | |
| ... | ... | ... | ... |

As illustrated in Table 1, depending on an item per personal image classification, pattern information corresponding to an area classification can be the same or different (For convenience, in Table 1, all pattern information are presented differently). Depending on the personal image classification item, a width of an eyebrow, a change of an eyebrow width, an orientation of the end of an eyebrow, a color of an eyebrow, a thickness of an eyebrow, and etc. can be defined differently.

Standard personal image data can be generated by superposition and mapping between pairs of elements which belong to a set of areas and a set of patterns. As an example of an embodiment, the standard personal image data can be registered as texts. In another desirable example of an embodiment of this invention, the standard personal image data can be generated from an image. In this case, the standard personal image data can be a pattern image. This standard personal image data is desirable to be constructed as a database at the side of a service server, but the database is also possible to be constructed at the user device.

The personal image classification is only an illustration. Therefore, experts in the same business can define a personal image classification differently. On the other hand, in the physiognomic impression in the Table 1, more detailed items like wealth, parental supports, children, popularity, marriage, fortune, and etc. can be added according to the accumulated classifications by physiognomy.

The personal image classification is classifications depending on preferences about physiognomic impression. This can be reconfigured as classifications depending on situations. For instance, personal image classification can be reconfigured as classifications depending on a party, a date, an interview, a career life, a travel, and moods, and recommendations from weather, clothes, and etc. Moreover, as another embodiment of this invention, the personal image classification can be a classification according to the celebrities' styles to be imitated. A personal image classification field can be a model of a celebrity that is registered in advance. Various embodiments of personal image classification like the aforementioned personal image rules can basically be defined as (area classification, pattern information, standard personal image data) depending on a personal image classification.

Figure 3:
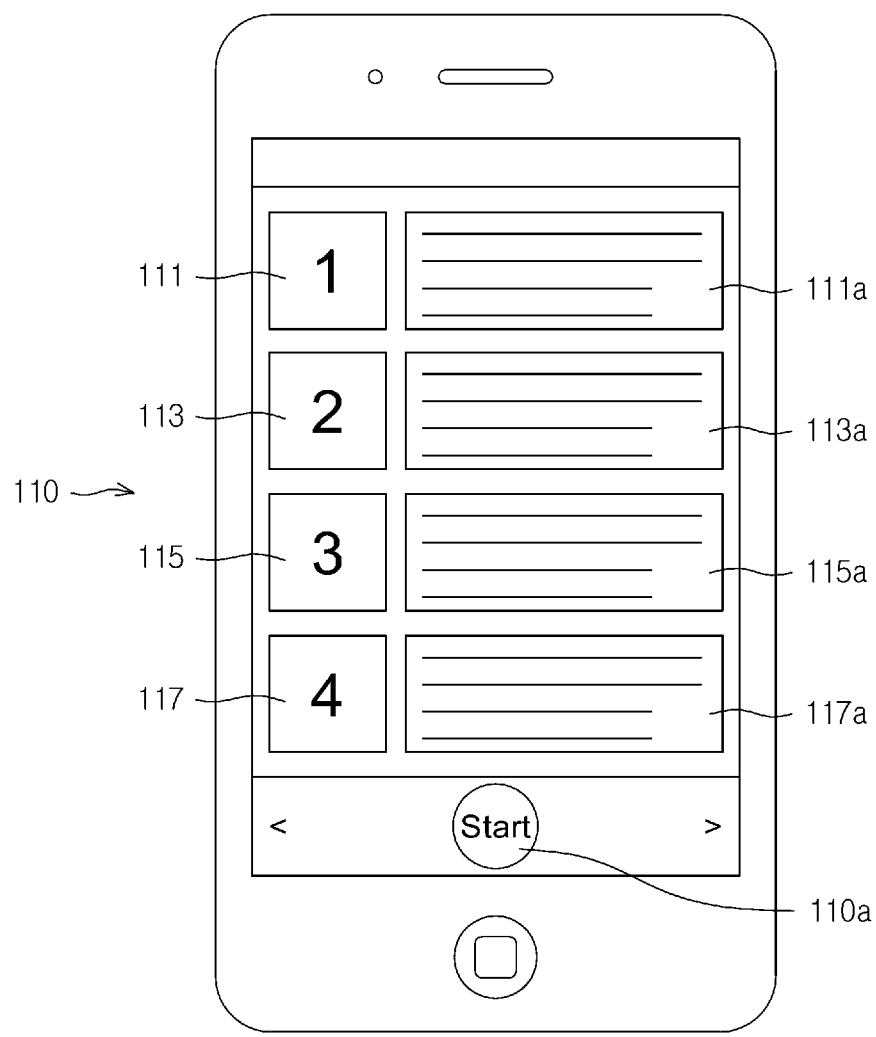
FIG. 3 depicts a configuration example of a user's screen 110 illustrating a personal image classification selection interface of a user's device.

A personal image classification table explained by the depicted illustrations above is defined in advance. A makeup supporting application provides a user interface wherein a user can choose personal image classification items. FIG. 3 shows an example of screen configurations for a personal image classification selection interface of a makeup supporting application.

In a personal image classification screen 110, personal image classification items 111, 113, 115, 117 are included. Although numbers are shown briefly in FIG. 3, texts corresponding to the naming of a personal image classification or icon images representing the features of a personal image classification can be used. And comment fields 111a, 113a, 115a, 117a explaining the corresponding personal image classification per personal image classification item are additionally included. Surely, these fields are not necessarily required to exist.

A user can push a start button 110a after choosing a personal image classification item using an input means. Then, according to a chosen event, by calling personal image rules that are previously stored depending on the corresponding personal image classification, a makeup guide content can be generated.

As another embodiment of this invention, personal image rules can be called by various methods such as a method that is set as a default in an application installed at a device for a certain personal image classification item (a user can modify items in an environmental setting), a method that determines certain personal image classification items in a server, and a method that recommends certain personal image classification items by obtaining the user's facial image and analyzing it, when a device's camera module is activated by an execution of a makeup supporting application.

Figure 4:
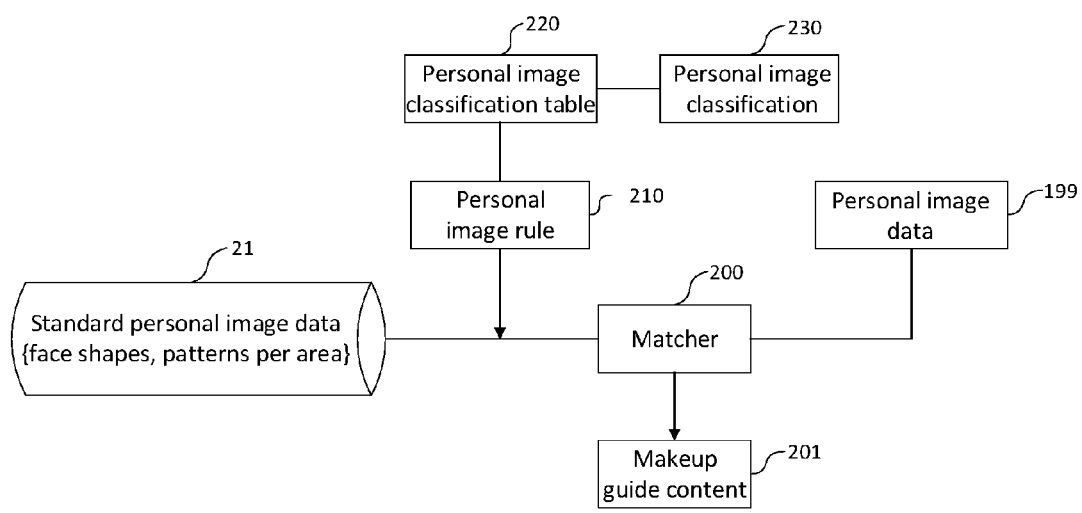
FIG. 4 is a schematic diagram illustrating that a matcher 200 generates a makeup guide content 201 according to an example of an embodiment.

FIG. 4 illustrates a method for generating a makeup guide content. The basic concept of this invention is to generate a makeup guide content by matching the user's personal image data 199 and the standard personal image data 21 in real time via a matcher 200. The user's personal image data 199 can be obtained from a device's camera module. The standard personal image data 21 is previously registered.

If the standard personal image data 21 is an image file, then matching a user's face and a face of the standard personal image data requires special operation rules. A human's face consists of invariant elements and variant ones. The invariant elements are in regards to a physical shape of a part or total of the face, such as a contour, a size, a position, and etc. that is to be uniquely determined by an individual. Changing the invariant elements is the function of plastic surgery, not the one of makeup. Parts that are varied by makeup can be defined as variant elements. A personal image rule is regarding the changes of the variant elements. By considering this point, the standard personal image data 21 can be distinguished as a set of {invariant elements, variant elements}, and in a desirable example of an embodiment, a set of {face shapes, patterns per area} can be regarded.

Figure 5:
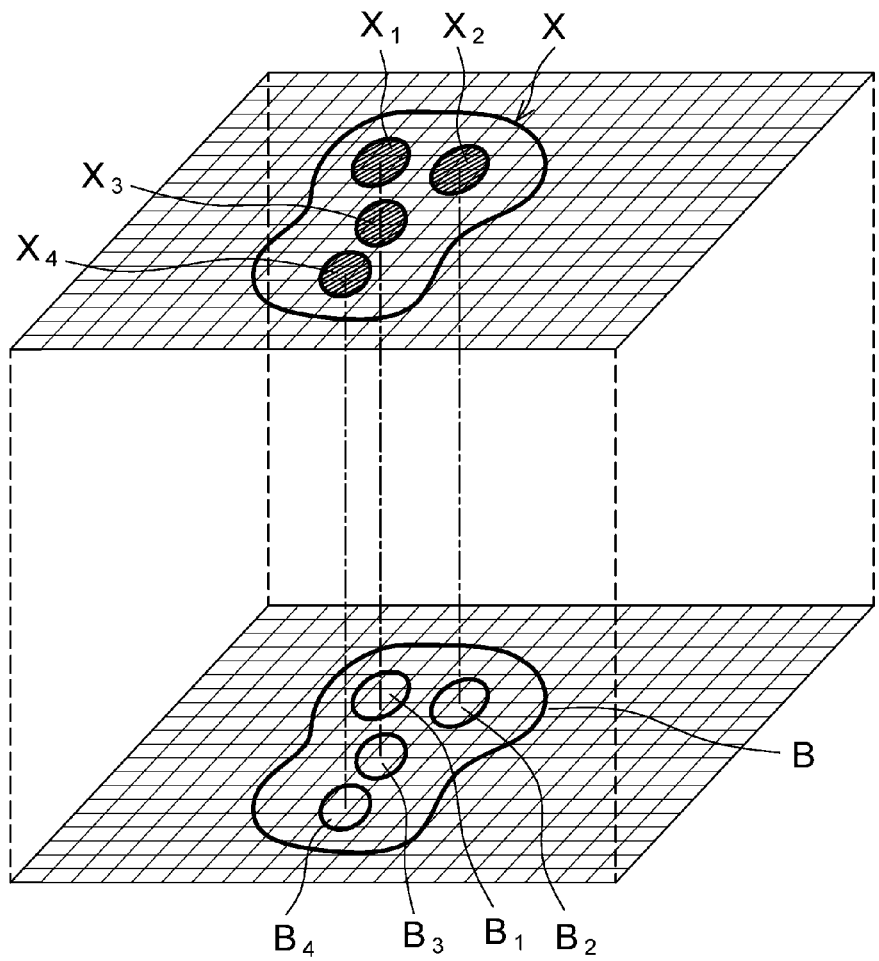
FIG. 5 is a conceptual diagram illustrating a configuration that superposes and maps a pattern image (X) that is previously registered on a user's face (B), in the generation of a makeup guide content.

For instance, a matcher 200 can generate a makeup guide content 201 by applying a user's face to an invariant element and an image of standard personal image data to a variant element. FIG. 5 explains these relations conceptually.

In FIG. 5, 'B' is a user's actual face image. 'X' is a pattern image, which is previously registered by a personal image classification. A matcher 200 is to superpose two different images and to map them. Desirably, each area, ($X_1$, $X_2$, $X_3$, $X_4$) is superposed and mapped to ($B_1$, $B_2$, $B_3$, $B_4$) as an instance. At this moment, invariant elements in a face are extracted from the featured elements of ($B_1$, $B_2$, $B_3$, $B_4$) and directly reflecting it, and variant element in a face revises a user's facial image using featured elements extracted from ($X_1$, $X_2$, $X_3$, $X_4$). By doing so, a generated image becomes a makeup guide image as a makeup guide content.

By doing it this way, this invention innovates a traditional method wherein it does not reflect the user's personal facial features but only provides a standard model's image. As a desirable embodiment of this invention, a makeup guide content reflects person's facial features. Thus, the most precise makeup support is possible. Moreover, when a user's actual face image can be different depending on a time and a place in the execution of a makeup supporting application, an optimal makeup support is possible at the instant.

On the other hand, by applying personal image rules, in the case of generating a makeup guide image as a makeup guide content, rules of the following methods can be applicable.

A face can be defined as a set of areas where the face is partitioned into each area, and it can be represented as follows:

$$face=\{area_1, area_2, \ldots, area_n\}$$

A personal image rule can exist as various rules to be applicable depending on personal image classification items and facial areas. A rule set consisting of each rule element can be defined as follows:

$$rule=\{rule_1, rule_2, \ldots, rule_m\}$$

As shown in the Table 1, the multiple pattern information, which is stored and managed by the databases, is registered as personal image classifications and facial areas. A specific personal image rule will be applicable to a specific area. If a condition of the rule is satisfied, then the corresponding rule is triggered and an area that matches to the corresponding rule is applied. At this moment, a makeup guide image with the corresponding area is modified. The following rule triggering operator '←' can be used.

$$face\_pattern_i=\{area_1 \leftarrow rule_1, \ldots, area_n \leftarrow rule_3\}$$

Then, an image as standard personal image data depending on each face's pattern information can be generated, and it can be represented as a pattern image. Then, it can be presented as the following expressions.

$$pattern\_image_i=face\_pattern_i$$

$$pattern\_image_j=face\_pattern_j$$

When a user continues to do makeup, a case with makeup support from this invention can be considered. Then, multiple pattern images are generated, and a makeup guide image for each pattern image can be different. Therefore, depending on the sequence of makeup application, a pattern image can be accumulated into the sequence, and the accumulation concept can be represented using an operator '⇐'. If foundation is applied and then lipstick is used, then there exists a pattern_image$_i$ where foundation is applied, and then there exists a pattern_image$_j$ where lipstick is used. Here, a generating sequence of a makeup guide image firstly creates a guide_image$_i$ by applying a pattern_image$_i$, prior to a pattern_image$_j$. Then, a pattern_image$_j$ is sequentially applicable to generate a guide_image$_j$. The makeup guide image can be considered as an image which is sequentially applied by each guide image as follows:

$$guide\_image_i \Leftarrow pattern\_image_i, guide\_image_j \Leftarrow pattern\_image_j$$

Let us review FIG. 4 again. Regarding a personal image classification 230, a personal image classification table 220, a personal image rule 210 of FIG. 4 was explained at Table 1. For instance, if the personal image classification 230 is determined depending on a user's selection event, a makeup supporting application determines the personal image rule 210 by accessing the personal image classification table 220. Then, by extracting the standard personal image data 21 and applying it to the personal image data 199 of a device, a makeup guide content 201 can be generated.

Like this, by matching standard personal image data that is already stored as a personal image rule to the user's personal image data and applying it, a makeup guide content can be generated. In another example of an embodiment of this invention, the makeup guide content can be an image file. By extracting featured elements from the user's personal image data which is collected in real time, according to the previously defined personal image rules, at least one featured element is revised, and the revised user's facial image is displayed by a screen of a makeup supporting application. The revised user's facial image is a makeup guide image, and that is the makeup guide content as an example of an embodiment.

In another embodiment of this invention, the makeup guide content can be presented through texts or voices. By extracting the featured elements from the user's personal image data that is collected in real time, the makeup guide content in a form of texts or voices corresponding to at least one featured element by previously defined personal image rules can be displayed by a device. The texts can be output by an application screen, and the voices by a speaker.

Figure 6:
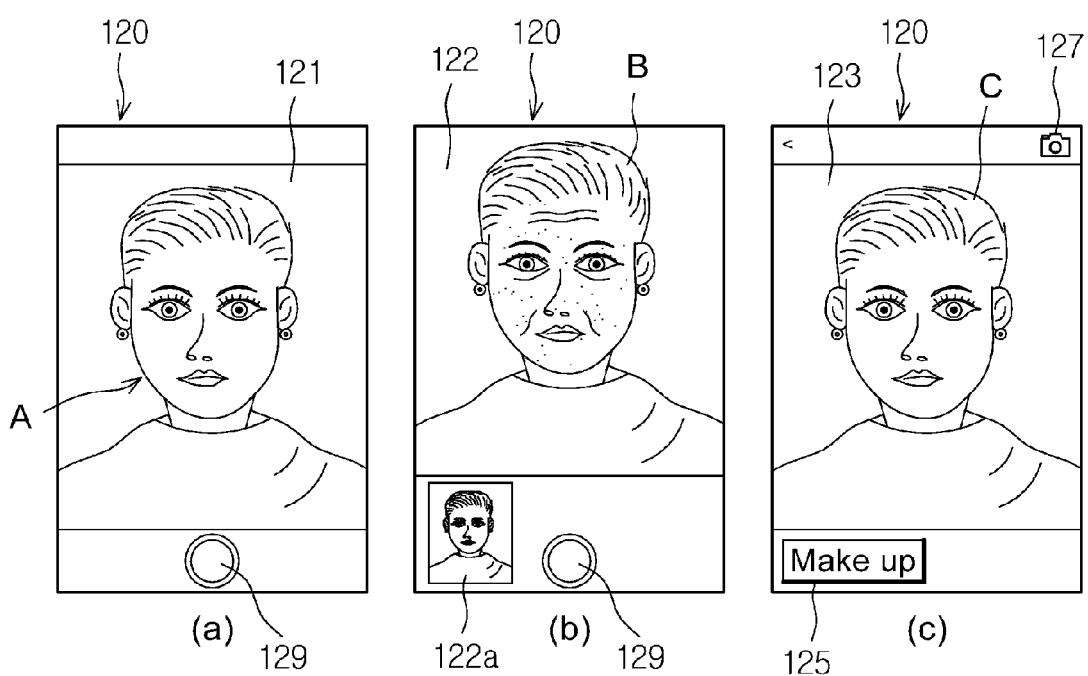
FIG. 6 illustrates a diagram for showing a scenario that a makeup guide content is displayed on a user's screen according to three examples of an embodiment.

FIG. 6 depicts screen scenarios from another embodiment of this invention. Suppose that a makeup supporting application was executed.

FIG. 6(a) shows a scenario, which applies personal image rules to a user's face that is collected from a camera in real time. In the scenario, a makeup guide content is just displayed on the application screens.

To run a scenario like FIG. 6(a), a makeup supporting application assists real time operations. Desirably, by executing the makeup supporting application, if a makeup support is requested, then it will communicate to a service server, where a matcher can match a user's face to a guide image to be recommended in real time. The former is represented as a user's personal image data, and the latter is presented as standard personal image data which is previously stored. In a camera area 121 of application screens 120 of FIG. 6(a), initially a user's actual face is displayed like a mirror, after completing real time operation works of the matcher, it can be displayed as an image of a makeup guide content (A). At this moment, the makeup guide content (A) is a facial image revised by applying personal image rules depending on a personal image classification.

By pushing a button 129, a makeup guide content (A) can be captured. Then a user can do makeup by watching the corresponding image from a photo gallery.

In FIG. 6(b), a scenario is illustrated where an application screen 120 is divided into two parts. Like a mirror of a large screen 122, a user's face (B) collected from a camera lens is displayed. In a small screen, a makeup guide content 122a generated by applying personal image rules is also displayed. In a scenario of FIG. 6(b), a user can do makeup by seeing one's own face like a mirror, and during the makeup process, by clicking a guide image recommended by an application and enlarging it, the makeup guide content can be referenced.

FIG. 6(c) is a scenario that shows doing makeup by accessing a photo gallery stored in a memory, not by seeing the user's face in real time via a camera lens.

A large screen area 123 of an application screen 120 in a user interface of FIG. 6(c) is a user's face (C) fetched originally from a photo gallery. Clicking a makeup button 125 can change a displayed face (C) on the screen. Namely, an application collects personal image data from the user's facial images stored as image files in a device's memory. Also, an application can generate a makeup guide content by applying previously stored personal image rule to the user's personal image data according to a chosen personal image classification, and it can display the corresponding image (C) on the screen. On the other hand, by clicking a camera icon 127, a user can see one's own face via a camera. Moreover, in that case, it can follow the scenarios of FIG. 6(a) or FIG. 6(b).

A makeup guide content of this invention can be stored in a device. An application can see the makeup guide content (A) by enlargement or modification. Personal image rules are already registered as featured elements per facial area. Moreover, a matcher can match a user's face to a guide image for each facial area. Therefore, the user can enlarge to see a makeup guide content (A) for each facial area or modify it.

Figure 7:
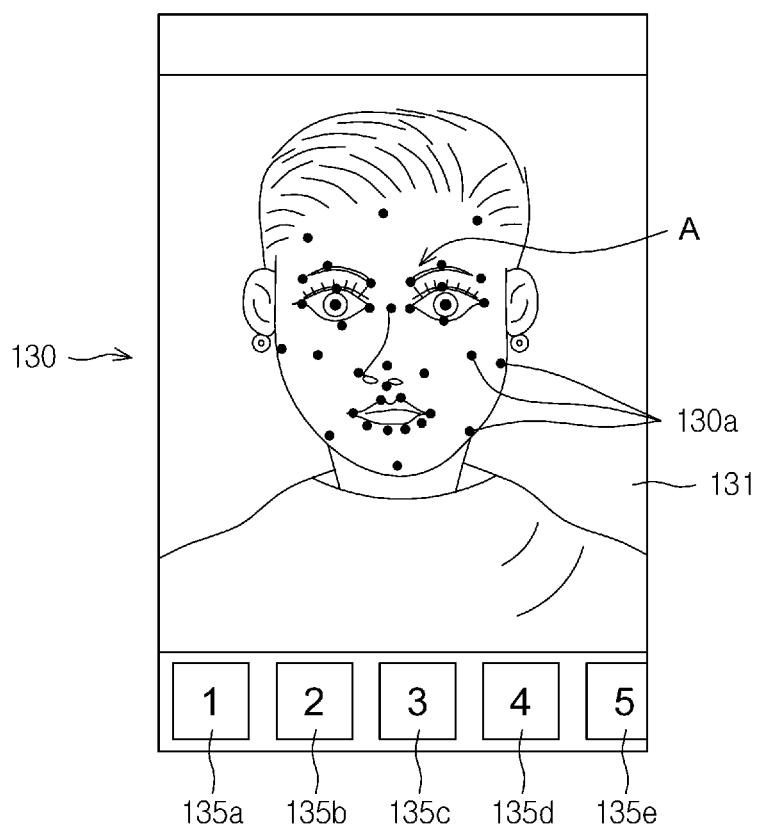
FIG. 7 depicts a screen scenario, showing that a makeup guide content has featured elements per facial area and it is also possible to watch by enlarging each facial area or modifying it according to an example of an embodiment.

Let us look at FIG. 7. An application screen 130 in FIG. 7 can be shown that a makeup guide content (A) stored in a device's memory can be seen by enlargement or by modification. Dots 130a in a main screen 131 represent featured elements for a facial area. A user can also see the image by enlarging via a multi touch function.

In a user interface (UI) configuration to see an enlargement of a makeup guide content (A), a selection button 135a, 135b, 135c, 135d, 135e can be a button, which recognizes a facial area. For instance, the configuration can consist of an eye part for 1, a nose part for 2, a lip part for 3, a left cheek part for 4, a right cheek part for 5, a forehead part for 6 (not illustrated), a chin part for 7 (not illustrated), and etc. When the user touches the button, then the corresponding part of the makeup guide content (A) is displayed through an enlargement.

In a user interface (UI) configuration, to see a modification of a makeup guide content (A), a selection button 135a, 135b, 135c, 135d, 135e can be a different personal image classification item. For instance, a makeup guide content (A) displayed in a main screen 131 as a young impression for 1, a sexy impression for 2, an intellectual impression for 3, a cool impression for 4, a warm impression for 5, a natural impression (an impression that appears naturally as if one did not apply any makeup) for 6 (not illustrated), a pretty impression for 7 (not illustrated), and etc. can be modified.

Also, the following selection button can be presented as a physiognomic personal image classification. The button can be changed as a physiognomic image for wealth, health, fortune, and etc. Moreover, it can be a personal image classification depending on a situation. A suitable makeup guide content can be presented as a date for 1, an interview for 2, a party for 3, a work look for 4, a travel look for 5, and etc.

Figure 8:
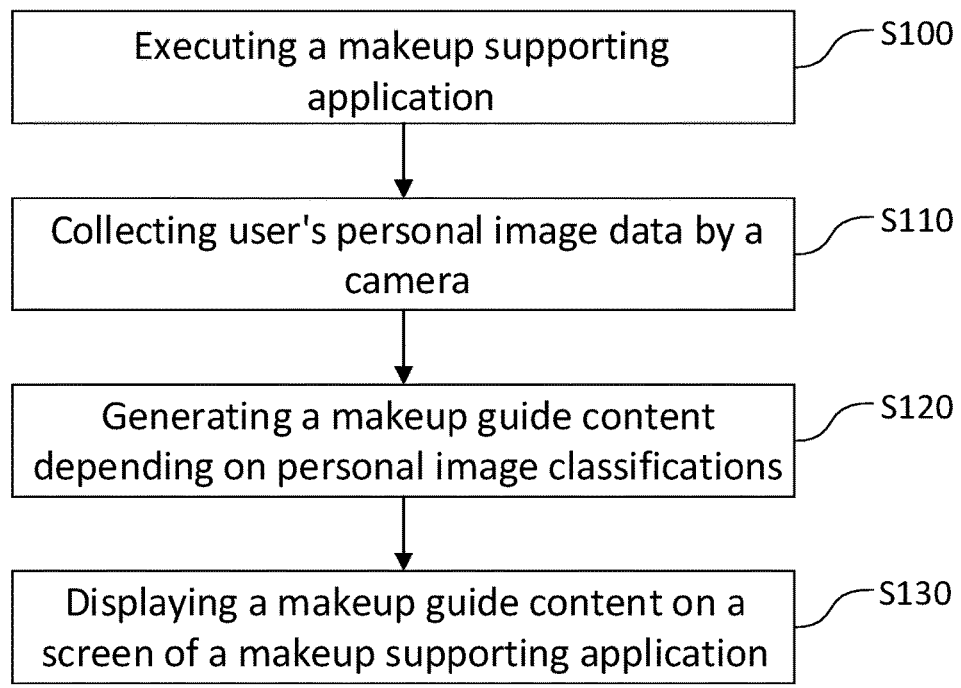
FIG. 8 is a schematic diagram illustrating a total process of makeup supporting methods according to an example of an embodiment.

By the aforementioned detailed explanations, the experts of this area can understand well the features of makeup supporting methods and the possibility of various modifications. At present, a schematic total process of the methods of this invention by referring to FIG. 8 is explained again by summarization.

First, a user executes a makeup supporting application installed at a device S100. The makeup supporting application can contain various functional modules. Amongst these modules, if the aforementioned module for requesting makeup supports is to be executed, a device and a service server can start to communicate with each other. Also, a processor controls a camera module equipped at the device and executes a camera application to orient a lens towards a user's face. The users adjust their own facial locations properly so that the device's camera photographs the user's own face accordingly.

Then, by a camera module, the user's personal image data is collected in real time S110. In another embodiment, the S110 phase can be substituted with a request of the user's image files that are stored in a memory.

A service server generates a makeup guide content in real time by applying previously determined or previously stored personal image rules according to a personal image classification chosen by a selection event via a device to the personal image data S120. In another desirable embodiment, the previously stored standard personal image data (pattern image) as personal image rules can be superposed with the user's facial image and mapped with it.

In the S120 phase, because the user's personal image data sent to a service server are not different from each user, finally this invention is possible to generate a personalized makeup guide content depending on the user. Moreover, even if a user is still the same person, the facial status can be different depending on the time and places, and it is possible to provide optimal personalized solutions by considering them.

Secondly, a makeup guide content to be generated is displayed by a screen of a makeup supporting application S130.

On the other hand, a makeup supporting method by this invention can be implemented by a form of program instructions that are to be executed by various computer means, thereby being recorded in a form of media that is capable of being read out by a computer. The media capable of being read out by a computer can be included as a standalone or a combination of program instructions, data files, data structures, and etc. The program instructions recorded in the media are specially designed and organized for this invention or they are publicly available releases for computer software professionals. An example of recorded media capable of being read out by a computer contains a magnetic medium like a hard disk, a floppy disk, and a magnetic tape, an optical medium like a Compact Disk-Read Only Memory (CD-ROM), and Digital Versatile Disk (DVD), a magneto-optical medium like a floptical disk, and a specially organized hardware device which stores program instructions and executes it, like a ROM, a Random Access Memory (RAM), a flash memory, and etc. The media can be a form of transmission media like optical fibers or metal wires, waveguides, and etc., including a carrier wave for transmitting signals that are designated as program instructions, data structures, and etc. An example of program instructions contains both of machine language code generated by a compiler and high-level language code that is to be executed by an interpreter and etc. The hardware device can be configured to run as at least one software module to perform operations of this invention, and as well as the software module and vice versa.

Moreover, a device executing a makeup supporting method of this invention has a built-in camera module and an installed makeup supporting application that applies personal image rules depending on personal image classifications. And the device contains at least one processor communicating to a camera module, and at least one memory communicating to the processor. And in a memory as media capable of being read out a by computer, through the aforementioned instructions, a processor performs an operation that collects the user's personal image data in real time by a camera module at the device, an operation that generates a makeup guide content by applying previously determined or previously stored personal image rules corresponding to the personal image classification chosen by a selection event to the personal image data, and an operation that displays the makeup guide content via a screen of the makeup supporting application screen.

In this invention, although it is not specially mentioned, the methods of this invention can be applicable to various image processing technologies and face recognition ones. If technical tasks of this invention are chosen and its resolving principle is determined, such technologies can be applicable and adaptable, suitably for the task and the principle.

Moreover, a makeup supporting method of this invention is to provide an optimally personalized solution that fits the user's purposes. Therefore, by entering information like the skin type, the skin tone, the skin's ageing status, the skin problems, and etc. or even when recognizing it automatically, a makeup guide content can be modified.

A generated makeup guide content by the user's requests can be collected, and it can be recorded through the databases of a service server. Also, collected data can be used to update personal image rules or to learn personal image rules for each individual.

A protection scope of this disclosure is not restricted by the presentations of explicitly explained examples of embodiments.

What is claimed is:

1. A makeup supporting method, the method comprising:
    collecting personal image data for a user from a built-in camera on a device, wherein the personal image data is collected in real time;
    generating a makeup guide content by applying personal image rules to the personal image data, wherein the personal image rules have been generated from a set of images of the user stored on the device, and wherein the personal image rules are stored on the device in a personal image classification table that maps between personal image classifications and personal image rules; and
    displaying the makeup guide content on a screen of the device, wherein the makeup guide content contains text displayed on a screen of the device or a voice output by a speaker of the device, and wherein at least one featured element is extracted from the personal image data of the user that is collected in real time.

2. The makeup supporting method of claim 1, further comprising providing a personal image classification selection interface, wherein an input means of the device is used to select a personal image classification on the personal image classification selection interface, or wherein a personal image classification is previously determined as a modifiable default value by an environmental setting of an application.

3. The makeup supporting method of claim 1, wherein the makeup guide content is generated by matching and applying standard personal image data that is previously stored as the personal image rules to the user's personal image data.

4. The makeup supporting method of claim 1, wherein the makeup guide content is a video file, wherein featured elements are extracted from the personal image data of the user that is collected in real time, wherein at least one featured element of the user's face is revised by the personal image rules, and wherein the revised user's face image is displayed on the device screen.

5. The makeup supporting method of claim 1, further comprising applying makeup to the user's skin.

6. A makeup supporting method, the method comprising:
    collecting personal image data for a user from a built-in camera on a device, wherein the personal image data is collected in real time;
    generating a makeup guide content by applying personal image rules to the personal image data, wherein the personal image rules have been generated from a set of images of the user stored on the device, and wherein the personal image rules are stored on the device in a personal image classification table that maps between personal image classifications and personal image rules; and
    displaying the makeup guide content on a screen of the device, wherein the personal image rules have facial area classification data that are previously determined, wherein the makeup guide content has pattern information for each facial area, and wherein the makeup guide content is generated by applying the facial area classification data to the personal image data.

7. A makeup supporting method, the method comprising:
    collecting personal image data from a user's facial image that is stored as an image file in a memory of a device;
    generating a makeup guide content with pattern information for each facial area by applying personal image rules to the personal image data, wherein the personal image rules are previously determined by the device or previously stored on the device depending on a personal image classification chosen by a selection event, and wherein the personal image rules have previously determined facial area classification data; and displaying the makeup guide content on a screen of the device, wherein the makeup guide content contains texts displayed on the device screen or voices output by a speaker, and wherein at least one featured element is extracted from the personal image data that is collected from the user's facial image.

8. The makeup supporting method of claim 7, wherein the makeup guide content is generated by matching and applying personal image rules relating to standard personal image data to the user's personal image data.

9. A device comprising:
a built-in camera;
a makeup supporting application that applies personal image rules depending on personal image classifications,
at least one processor that is configured to communicate with the camera; and
at least one memory that is configured to communicate with the processor, wherein the memory contains instructions that are configured to be executed by the processor to collect a user's personal image data in real time via the camera, generate a makeup guide content by applying the personal image rules, depending on the personal image classification chosen by a selection event, to the personal image data, and display the makeup guide content on a screen of the device, wherein the personal image rules have facial area classification data that are previously determined, wherein the makeup guide content has pattern information for each facial area, and wherein the makeup guide content is generated by applying the facial area classification data to the personal image data.

10. The device of claim 9, wherein the makeup supporting application provides:
a personal image classification selection interface corresponding to makeup purposes; and
an input means of the device that is configured to allow a user to select a personal image classification.

11. The device of claim 9, wherein the makeup supporting application is configured to generate a makeup guide content by matching and applying previously stored standard personal image data as the personal image rules to the user's personal image data.

* * * * *